United States Patent
Thomson et al.

(10) Patent No.: US 6,239,739 B1
(45) Date of Patent: *May 29, 2001

(54) METHOD FOR ASSOCIATION

(75) Inventors: David Thomson, Askim; Benny Bentland, Lindome; Thomas Kronhamn, Hälsö, all of (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,349

(22) Filed: Sep. 25, 1998

(30) Foreign Application Priority Data

Sep. 26, 1997 (SE) ........................................ 9703470

(51) Int. Cl.⁷ ............................. G01S 13/72; G01S 13/66
(52) U.S. Cl. ................................. 342/96; 342/89; 342/90; 342/94; 342/95; 342/97; 342/195
(58) Field of Search ................................. 342/75, 76, 89, 342/94–99, 195, 36, 90, 73, 74

(56) References Cited

U.S. PATENT DOCUMENTS

| | | | |
|---|---|---|---|
| 4,992,795 | * 2/1991 | Lassallette et al. | 342/90 |
| 5,138,321 | * 8/1992 | Hammer | 342/36 |
| 5,325,098 | * 6/1994 | Blair et al. | 342/95 |
| 5,414,643 | 5/1995 | Blackman et al. | 342/95 |
| 5,491,645 | 2/1996 | Kennedy et al. | 342/357 |
| 5,798,942 | * 8/1998 | Danchick et al. | 342/90 X |
| 5,909,189 | * 6/1999 | Blackman et al. | 342/90 |

FOREIGN PATENT DOCUMENTS

| | | |
|---|---|---|
| 0 607 015 | 7/1994 | (EP) . |
| 0 660 134 | 6/1995 | (EP) . |

* cited by examiner

*Primary Examiner*—Bernarr E. Gregory
(74) *Attorney, Agent, or Firm*—Burns, Doane, Swecker & Mathis, L.L.P.

(57) ABSTRACT

Methods of associating a first target track and one of a group of target tracks measured by a radar system, in which the first target track is compared with each of the target tracks in the group of target tracks based on movement between two selected target positions, one in each of the two target tracks. Predetermined maximum numbers of changes in target parameters such as course and speed are assumed to have been able to take place during the movement, and a target parameter for the two positions is allowed to vary while other target parameters are kept constant. A possible range for the varying parameter is determined that is consistent with movement between the two positions, and if a measured value of the varying parameter lies within the range, target tracks are associated with each other.

10 Claims, 5 Drawing Sheets

METHOD FOR ASSOCIATION

This application claims priority under 35 U.S.C. §§119 and/or 365 to 9703470-6 filed in Sweden on Sep. 26, 1997; the entire content of which is hereby incorporated by reference.

BACKGROUND

The present invention has its main application within the field of sensors and relates to a method for association between tracks of moving measurement objects, in particular when a pause has occurred between the target tracks between which association is to be performed.

Certain types of sensor, for example search radar systems or surveillance radar systems, do not measure the position of one and the same measurement object constantly but instead measure at discrete times the positions of a plurality of measurement objects within a given area or volume. In connection with this type of sensor, it may be desirable to obtain information about where a measurement object will be located at a point in time before the next measurement time, in other words it is desirable to be able to predict the position of the measurement object, the target, before the next measurement time.

Such prediction is often referred to as target tracking and is performed on the basis of a number of consecutive measurement times which are hereinafter referred to as detections. Target tracking provides information about, for example, the speed, course and acceleration of the target. This information is obtained with the aid of calculations which are performed on the basis of a number of consecutive detections of the target concerned. A problem may arise in the calculations if more than one target is located within the area or volume scanned by the sensor. The problem lies in the uncertainty about which new detections are to be considered to belong to which existing target tracks.

This problem can be solved by so-called association, which is often performed in two stages, correlation and allocation. Correlation usually consists of a method for determining the degree of probability that a new detection belongs to an existing target track. On the basis of the result of the correlation, the new detection can then be allocated to a given existing target track.

A conventional method for association is to predict at the correlation stage where the targets that are being tracked will be located the next time they are detected, after which a tracked target is allocated the new detection that lies closest to the predicted position of the tracked target.

There are a great many methods for obtaining improved reliability in association on the basis of this fundamental principle. One way is, with reference to the last detected position of a tracked target, to create an imaginary area or volume within which it is considered that it will be possible for the tracked target to be located at the next detection. A new detection which is carried out within this area or volume is allocated to the tracked target. Another method is, on the basis of a tracked target, to initiate a number of alternative tracks, so-called hypothetical tracks, in order at a later stage to investigate which of the hypothetical tracks corresponds most closely to a given new detection.

The problem with association between new detections and existing target tracks is rendered even more difficult if the sensor used has made a pause in its scanning of a given area or volume. It has not been possible for the target tracks that were located within this area or volume during the pause to be updated with new detections during the pause. The method described above for calculating possible positions for targets after the pause then leads to unreasonably large areas for the possible positions. In the same way, the method using hypothetical tracks leads to altogether too many allocation possibilities.

European Patent Application EP 607 015 describes a method for association between a new detection and an existing target track with the aid of the first of the methods described above, in other words information about the previous movement of the target is used to predict a volume within which the new position of the target may be.

European Patent Application EP 660 134 describes a method for tracking a number of targets simultaneously. The method includes the formation of hypothetical tracks, in principle according to the second of the two methods described above.

SUMMARY

The problem that is solved with the aid of the present invention is that of obtaining improved reliability in association in connection with target tracking with the aid of sensors, in particular association carried out after a pause in the scanning by a sensor of a given area or volume.

According to the invention, this problem is solved by, in contrast to previously known methods, not attempting to perform association between new detections and existing target tracks. In the method according to the invention, new target tracks are instead initiated after a pause, which new target tracks are each compared with the target tracks that existed before the pause for the purpose of being able to perform correct allocations.

When, in the association method according to the invention, a new target track is compared with one of the target tracks that existed before the pause, use is made of the fact that certain parameters of the target tracks compared are known, such as points in time, positions, courses and speeds.

On the basis of certain assumptions, calculations are performed, in each comparison, relating to movement between two positions, one in each of the two target tracks compared. The assumptions that are made according to the invention are that a given maximum number of changes in course and changes in speed with given maximum values can have taken place during movement between the two positions. In the calculations, one of the known parameters for the two positions is allowed to vary, while other known parameters are kept constant. The calculations that are performed relate to a maximum and a minimum value which the parameter that is allowed to vary may assume in order for movement to be possible between the two positions.

If the known value of the parameter that is allowed to vary lies between the calculated maximum and minimum values, the new target track is allocated to the target track with which it is compared.

If, in accordance with the principle of the invention described above, it is possible to perform more than one allocation, the allocation is made that is considered to indicate the smallest change with regard to the speed and/or course during the movement.

Every sensor has a certain measurement inaccuracy, due to which the parameters that according to the invention are kept constant are nevertheless allowed to vary to an extent that is defined by the measurement inaccuracy of the sensor.

In a preferred embodiment of the invention, the movement time, in other words the time difference between the two positions compared, is the known parameter that is allowed to vary. The maximum and minimum values for the parameter that is allowed to vary are then the longest and, respectively, the shortest time that the movement can have taken between the positions compared. If the movement time lies between this shortest and, respectively, longest time, the new target track is allocated to the target track with which it is compared.

As target tracks are built up on the basis of a number of detections, the method according to the intention means that it will be possible for attempts at comparison after a pause to be made only when a number of detections for one and the same target have been carried out after the pause. This delay can nevertheless be considered to be compensated by the increased reliability that is obtained in the association, and also by the fact that the delay is in most cases negligible in relation to the duration of the pause.

BRIEF DESCRIPTION OF THE DRAWINGS

The invention will be described in greater detail below with the aid of examples of embodiments and with reference to the appended drawings, in which.

DETAILED DESCRIPTION

Figure 1:
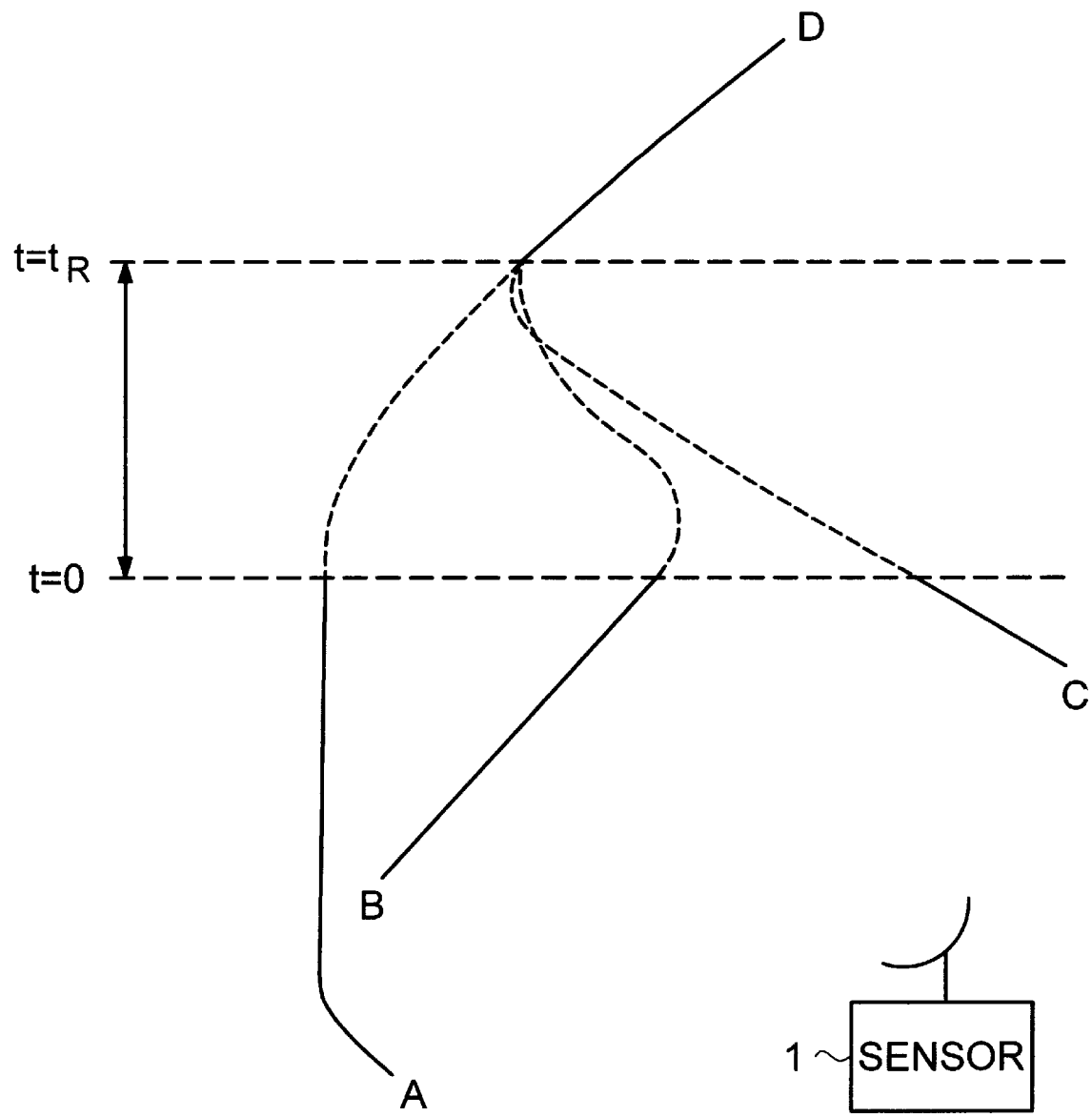
FIG. 1 shows the principle of target tracks before and, respectively, after a pause.

FIG. 1 shows an area which is scanned by a sensor 1, in this exemplary embodiment a search radar or surveillance radar system. It should be pointed out that the fact that the exemplary embodiment shows an area and not a volume is simply for the sake of clarity, the method according to the invention also being suitable for use with sensors which scan a volume.

It can be seen from FIG. 1 that the radar system or sensor 1 has made a pause in its scanning of the area. The pause occurred between the time t=0 and the time t=$t_R$. FIG. 1 shows three target tracks A, B and C, and a fourth target track D. Target tracks A, B and C were made before the pause, and target track D was initiated after the pause. Possible movements during the pause are indicated by dashed lines in FIG. 1. The pause is assumed to have been a pause which is longer than that caused by the usual scan rate of the radar system, but it can also, of course, be the pause that occurs during the usual scan rate of the radar system.

One task of the system to which the radar in the example belongs is to investigate whether target track D should be allocated to one of target tracks A, B and C which existed before the pause and, if so, which.

So as to be able to decide whether and, if so, which allocation should be performed in situations such as that shown in FIG. 1, a number of assumptions are made according to the invention with regard to the possibilities of the targets A, B and C for movement during the pause.

The assumptions made relate to how many changes in course and changes in speed a tracked target may be considered to have made during the pause, and also maximum values of these changes in speed and changes in course. In the exemplary embodiment shown, it is assumed that one change in course and one change in speed could take place during the pause.

The numerical values for the maximum change in speed and the maximum change in course which it is assumed could take place during the pause are not of major significance either for the invention or for this description and will therefore not be discussed in greater detail here. A suitable method of setting these numerical values, however, is to start out from the type of target that is being tracked, for example vessels, aircraft or cars.

In a preferred embodiment, the same values for maximum changes in speed and changes in course are used for all targets but, in an alternative embodiment, it is also possible to make use of individual values for each target. These individual values can then suitably be set with the aid of knowledge possessed about the target, for example on the basis of the behaviour of the target during the time it has been tracked, or knowledge about the target obtained from external sources. Examples of such external sources may be other sensors, aviation control systems etc.

On the basis of the assumptions made about the changes in course and changes in speed which a tracked target may be considered to have made during the pause and the knowledge possessed about the positions of the respective tracked target, a shortest and a longest time ($T_{min}$, $T_{max}$) is calculated, for each of the target tracks that existed before the pause, for the movement between two positions, where one position is a position which existed in the respective target track before the pause and the second position is a position in the target track with which comparison is carried out, in other words the target track that was initiated after the pause.

The two positions which are used in calculations according to the invention can, broadly speaking, be selected arbitrarily from the positions contained in the respective target track before the pause and in the target track which was initiated after the pause. In the exemplary embodiment of the invention shown here, however, the positions corresponding to the last detection in the target tracks that existed before the pause and the first detection in the target track that was initiated after the pause are used.

Figure 2:
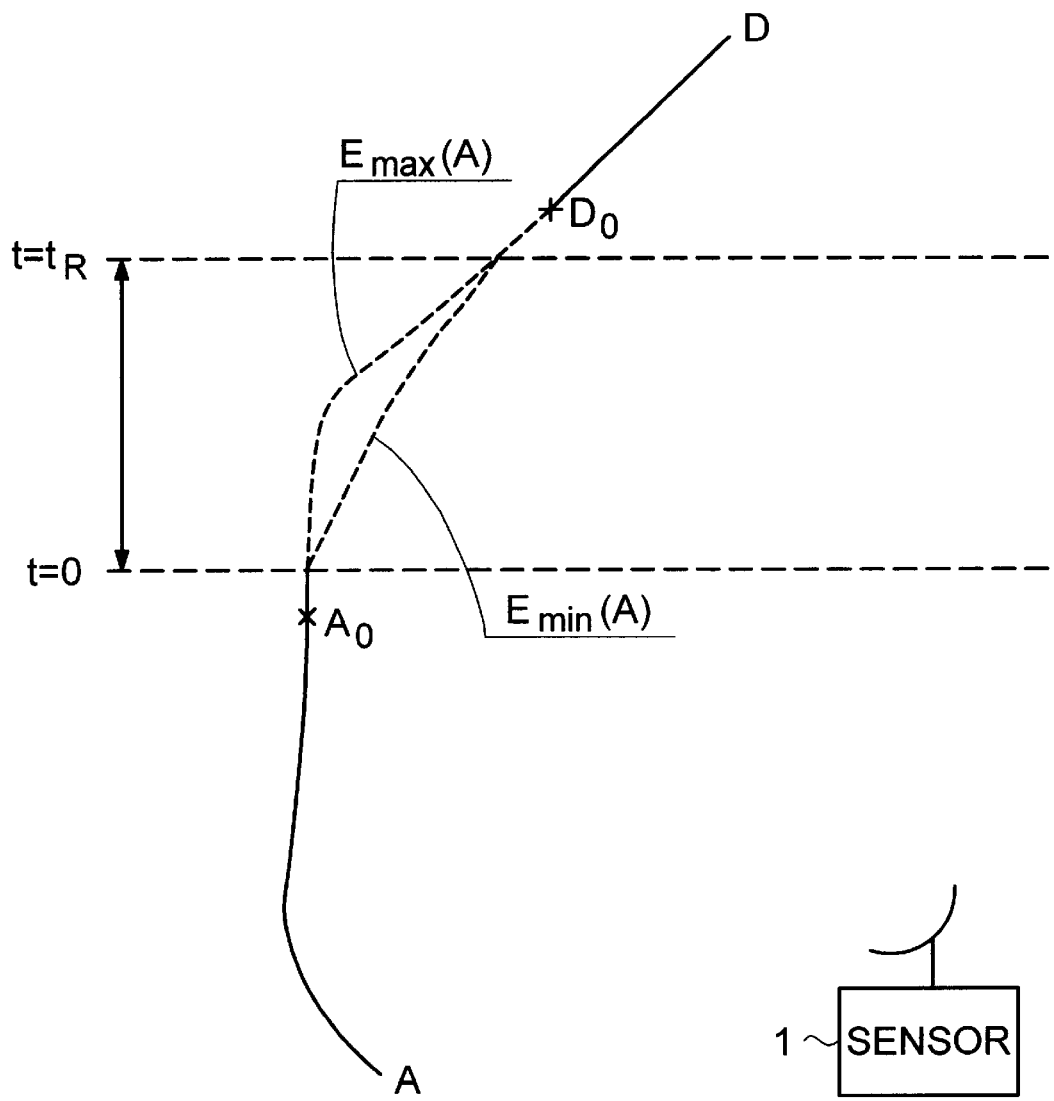
FIGS. 2–4 show the principle of calculating the shortest and longest movement time during the pause.

In FIG. 2, crosses indicate the positions $A_0$ and $D_0$ which are used in the calculations for comparison between target tracks A and D according to the invention. Positions $A_0$ and $D_0$ each correspond to a detection of the respective target. Position $A_0$ is drawn slightly before the pause began at time t=0, which is due to the fact that the radar system or sensor 1 performed the detection corresponding to position $A_0$ slightly before the pause began. In the same way, position $D_0$ is not drawn exactly at the time t=$t_R$ when the pause ended, which is due to the fact that, as was explained initially, a target track is initiated only after a number of detections and to the fact that the first detection in target track D did not take place exactly when the pause ended.

Also shown in FIG. 2 are the two movements $E_{max}(A)$ and $E_{min}(A)$ for target track A which, taking into consideration the abovementioned assumptions about the possibilities of a target for movement during the pause, will take the longest and, respectively, the shortest time for movement between positions $A_0$ and $D_0$. Movement $E_{min}(A)$ which takes the shortest time, $T_{min}(A)$, is the movement with as early a change in speed and as slow a movement to change course as possible. Movement $E_{max}(A)$ which takes the longest time, $T_{max}(A)$, is obtained in a corresponding manner with as late a change in speed and as tight a change in course as possible. The mathematical explanation of these two relationships is not of major significance for the invention and is therefore omitted from this description.

In order to investigate whether target track D should be allocated to target track A, a comparison is then carried out according to the invention between the time $\Delta T(A_0, D_0)$ which has elapsed between positions $A_0$ and $D_0$ and the time interval which is defined by $T_{min}(A)$ and $T_{max}(A)$. All the times that are used in this comparison are, as has emerged, well-known for the system of which the radar forms part.

The comparison carried out according to the invention can be summarized by the following mathematical condition:

$$T_{max} \geq \Delta T \geq T_{min} \quad (1)$$

which with the designations according to the case shown in FIG. 2 becomes:

$$T_{max}(A) \geq \Delta T(A_0, D_0) \geq T_{min}(A) \quad (2)$$

If condition (1) is satisfied, it is considered according to the invention that the new target track should be allocated to the target track with which it is compared.

Figure 3:
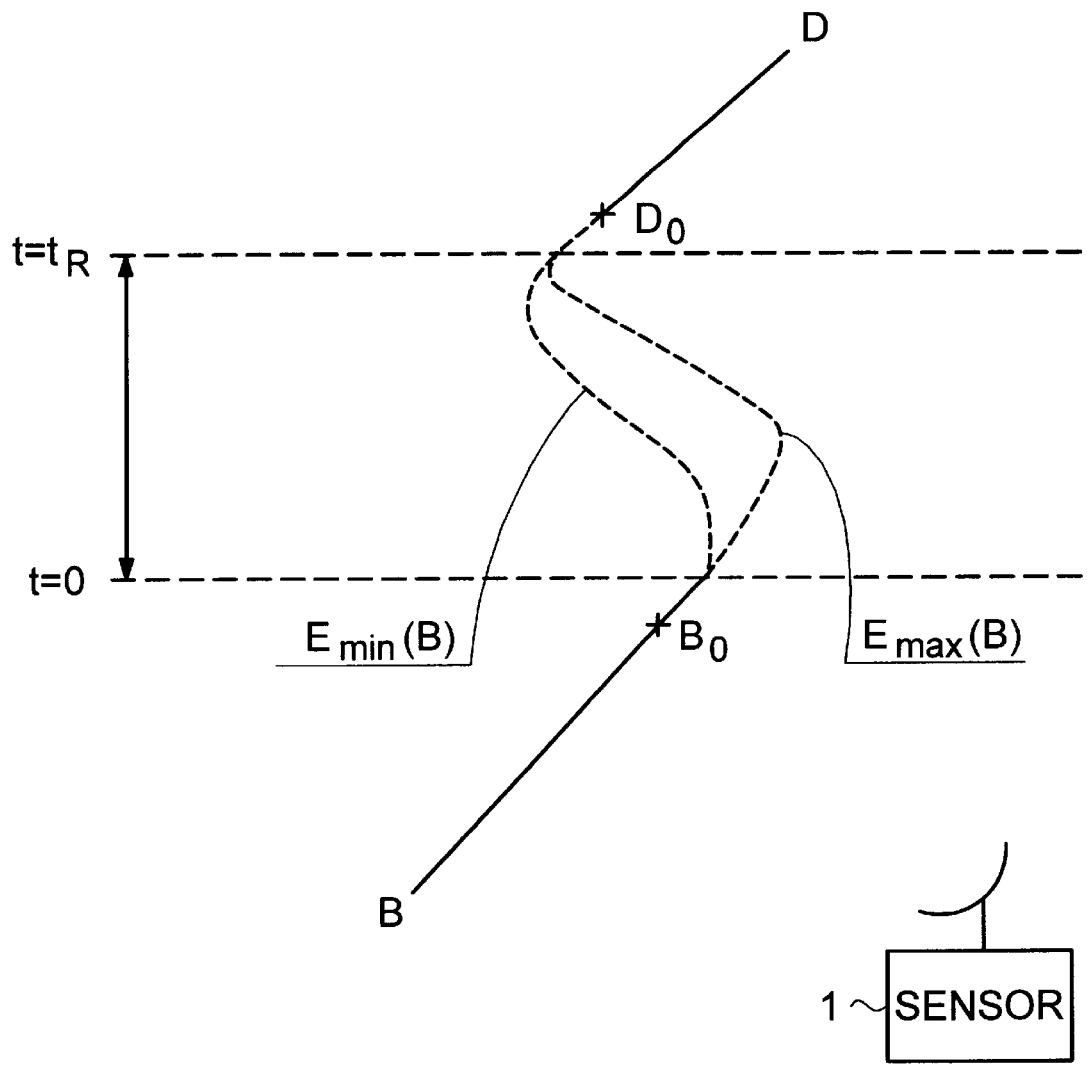

FIG. 3 shows, in a manner corresponding to that in FIG. 2, the two positions $B_0$ and $D_0$ which are used in the comparison between target tracks B and D, and the two tracks $E_{min}(B)$ and $E_{max}(B)$ which, taking into consideration the abovementioned assumptions about the capacity for manoeuvre during the pause, give the shortest and, respectively, the longest time $T_{min}(B)$ and $T_{max}(B)$ for movement between the points $B_0$ and $D_0$. For the reasons explained in connection with FIG. 1, the points $B_0$ and $D_0$ lie slightly before and, respectively, after the pause. Point $D_0$ is here suitably the same point as point $D_0$ in FIG. 1.

In order to investigate whether target track D should be allocated to target track B, a comparison is then carried out according to the invention between the time $\Delta T(B_0, D_0)$ which has passed between positions $B_0$ and $D_0$ and the interval which is defined by $T_{min}(B)$ and $T_{max}(B)$. Expressed mathematically, this becomes the condition:

$$T_{max}(B) \geq \Delta T(B_0, D_0) \geq T_{min}(B) \quad (3)$$

Figure 4:
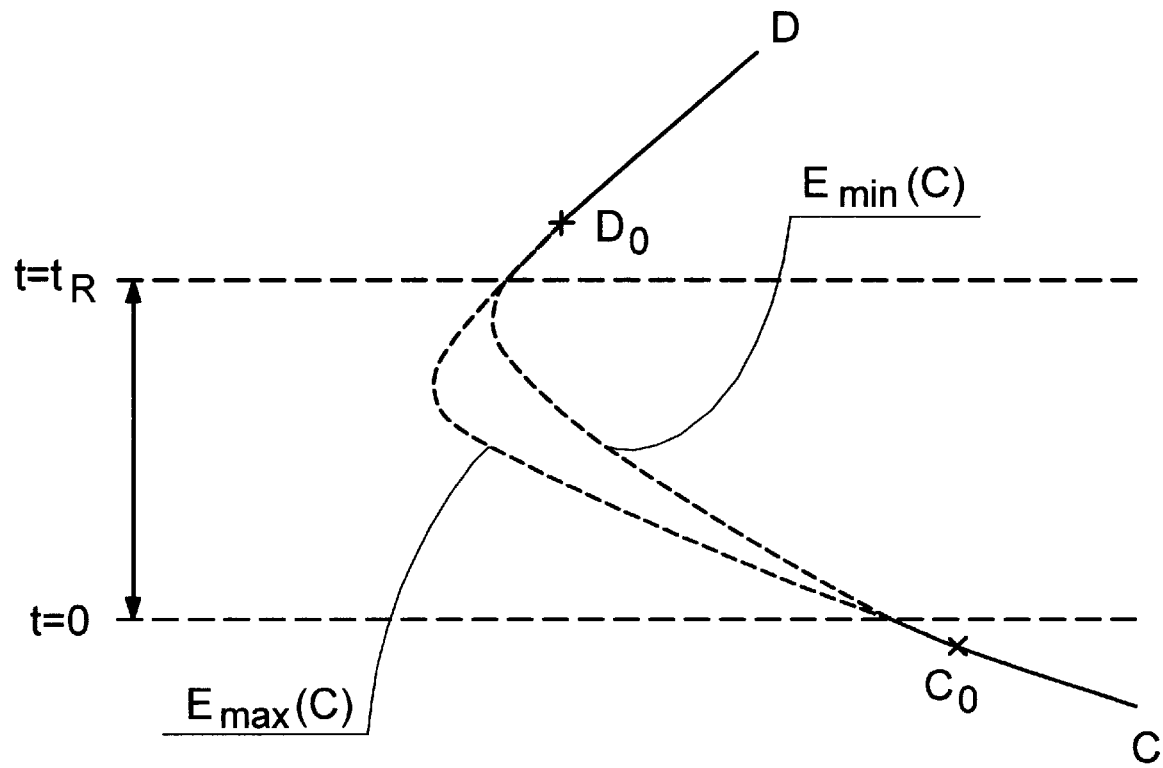
Figure 4:
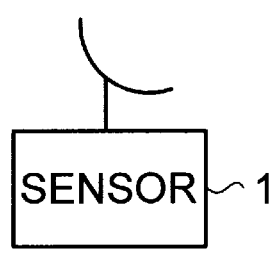

With reference to FIG. 4, comparison is carried out in the same way $$T_{max}(C) \geq \Delta T(C_0, D_0) \geq T_{min}(C) \quad (4)$$

In the comparisons described above, however, it can be seen that the respective condition (2), (3) and (4) is satisfied in all the comparisons. So as to be able to perform the most probable allocation in such cases, assumptions are made, as has been mentioned previously, in the method according to the invention regarding how many changes in course and, respectively, changes in speed a target may be considered to have made during the movement concerned. In this exemplary embodiment, a maximum of one change in course and one change in speed are assumed during said time interval.

Target tracks include, as mentioned, information about the speed, acceleration and course of the respective tracked target at every point in the respective target track, which means that the sensor system 1 can calculate how many changes in course and, respectively, changes in speed are required in order to move between two points which are compared with one another. These calculations show that target track B must have made at least two changes in course in order to move from $B_0$ to $D_0$, which precludes target track D from being allocated to target track B.

Calculations regarding target tracks A and C show, however, that both these target tracks may have carried out the movement concerned with at most one change in course and one change in speed. So as to be able to perform the most probable allocation in such situations as well, allocation is performed in the method according to the invention to the target which has made the smallest absolute change with regard to course and/or speed during the interval concerned. At this stage, in other words, it is not the number of changes during the movement with regard to course and/or speed that is used but the absolute change in these parameters.

Calculations relating to target tracks A and C show that it is target track A that needs to have made the smallest change with regard to both speed and course during movement to point $D_0$. Target track D is therefore allocated to target track A.

Figure 5:
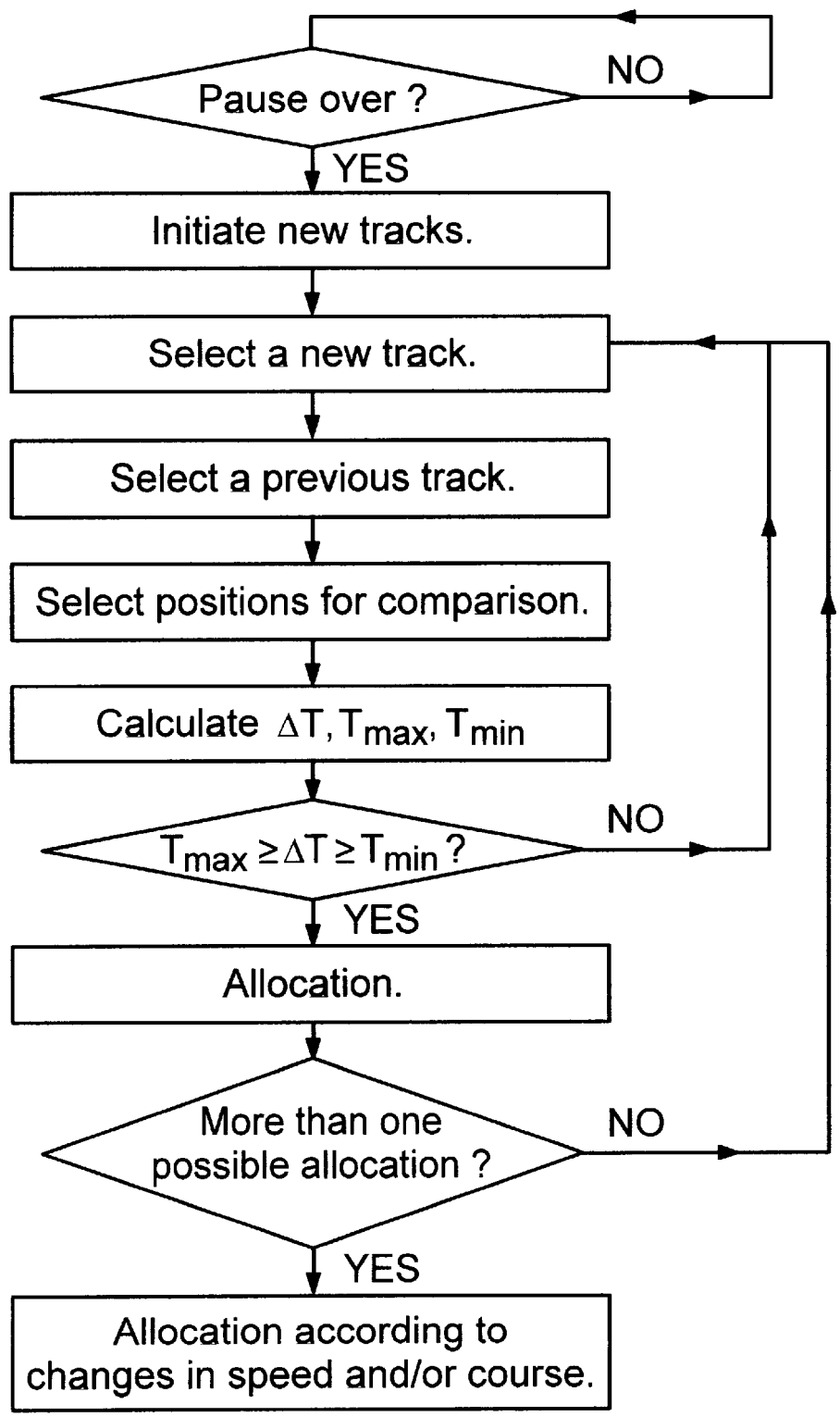
FIG. 5 is a flow chart of a method according to the invention.

FIG. 5 shows a flow chart of an example of a method according to the invention.

The invention can be realized using any combination of hardware and software but, in a preferred embodiment, it is realized essentially exclusively using software.

The invention is not limited to the embodiment described above but can be varied freely within the scope of the patent claims below. Of course, the number and size of the changes in course and changes in speed which it is assumed could take place during a movement can, broadly speaking, be selected arbitrarily depending upon the application concerned.

In the exemplary embodiment shown above, it has been assumed throughout that the most probable allocation is that which indicates the smallest change in speed and/or course during a given time interval. These are assumptions which are specific to a given application of the method according to the invention, and may, of course, be varied among different applications within the scope of the invention. In other applications, for example, the most probable allocation may be that which indicates the greatest change in speed and/or course during a given time interval, or the allocation that indicates the greatest change in speed combined with the smallest change in course etc.

Furthermore, throughout the example above, only one target track has been shown after the pause. This has been done exclusively for the sake of clarity, the invention can, of course, be applied where there is more than one target track after a pause. In such cases, one target track at a time from the group of target tracks initiated after the pause is compared with all the target tracks in the group of target tracks that existed before the pause, in which connection the method according to the invention described above is followed. On the other hand, of course, one target track at a time from the group of target tracks that existed before the pause can be compared with all the target tracks initiated after the pause.

The known parameter which has been allowed to vary in the exemplary embodiment shown is time. According to the invention, however, essentially any known parameter can be allowed to vary according to the principle described.

The positions in the target tracks which are compared with one another do not have to be the last position before and, respectively, the first after the pause but can, broadly speaking, be selected arbitrarily. Nor do the positions have to be those positions in the respective target track that correspond to detection; it is also possible to use predicted positions.

Finally, it should be mentioned that the sensor in which the method according to the invention is applied does not have to be a radar system; the invention can be applied in a great many types of sensor.

What is claimed is:

1. A method of associating a first target track and one of a plurality of target tracks measured by a sensor, the first target track and plurality of target tracks each including a number of measured target positions having respective measured parameters of at least target speed, target course, and time, the method comprising the steps of:

successively selecting target tracks from the plurality of target tracks;

comparing the first target track with each selected target track based on a movement between a measured target position in the first target track and a measured target position in the selected target track, wherein the comparing step includes:
- determining, for a selected measured parameter, a maximum value and a minimum value that together define a range for the selected measured parameter within which the movement would have been possible given a respective maximum number of changes within given maximum limits of all other measured parameters; and
- determining whether the selected measured parameter's value at the measured target position in the selected target track is within the range; and
- allocating the selected target track to the first target track based on whether the selected measured parameter's value is within the range.

2. The method of claim 1, wherein the selected measured parameter is time and the maximum value and minimum value are respectively a longest time and a shortest time that the movement can have taken.

3. The method of claim 1, wherein, if more than one target track selected from the plurality of target tracks is allocable to the first target track, then allocating an allocable selected target track based on whether the allocable target track has a smallest change of at least one of the other measured parameters during the movement.

4. The method of claim 1, wherein the first target track includes target positions measured after target positions included in the plurality of target tracks.

5. The method of claim 1, wherein the first target track includes target positions measured before target positions included in the plurality of target tracks.

6. The method of claim 1, wherein the position in the first target track that is used for comparison is the position in the first target track that is closest in terms of time to the position with which comparison is made.

7. The method of claim 1, wherein the movement is between a measured target position in the first target track and the measured target position in the selected target track that is temporally closest thereto.

8. The method of claim 1, wherein the maximum number of changes in target course during the movement is one.

9. The method of claim 1, wherein the maximum number of changes in target speed during the movement is one.

10. The method of claim 1, wherein the sensor is a radar and the determining steps are carried out for one selected measured parameter with other measured parameters being kept constant.

* * * * *